Feb. 23, 1960 | J. A. BOBKO | 2,925,914

PHONOGRAPH RECORD HOLDER

Filed June 26, 1956 | 2 Sheets-Sheet 1

INVENTOR.
Joseph A. Bobko
BY Frank E. Liverance Jr.
Attorney

Feb. 23, 1960 J. A. BOBKO 2,925,914

PHONOGRAPH RECORD HOLDER

Filed June 26, 1956 2 Sheets-Sheet 2

INVENTOR.
Joseph A. Bobko
BY Frank E. Liverance Jr.
Attorney

United States Patent Office 2,925,914

Patented Feb. 23, 1960

2,925,914

PHONOGRAPH RECORD HOLDER

Joseph A. Bobko, Grand Rapids, Mich.

Application June 26, 1956, Serial No. 593,909

2 Claims. (Cl. 211—40)

The present invention relates to a novel and useful disk record holder which is adapted to be slidably mounted between upper and lower supports, such as the bottom and top of a cabinet or spaced shelves, and on each of which two records of large size or four records of smaller size may be carried, being slidably moved outward from access to and removal of the records and pushed back inwardly for enclosure of the records within a cabinet or between upper and lower shelves.

It is an object and purpose of the present invention to provide a novel record holder which can carry a maximum number of records and which is easily operated and manipulated for placing the records on the holder or removing them therefrom. With my invention a sturdy and durable record holder is made, which may be mounted along with others side by side for independent movement.

An understanding of the invention may be had from the following description, taken in connection with the accompanying drawings, in which, Fig. 1 is a transverse vertical section through a cabinet having a plurality of record holders of my invention located therein.

Like reference characters refer to like parts in the different figures of the drawings.

Figures 1, 2, 3:
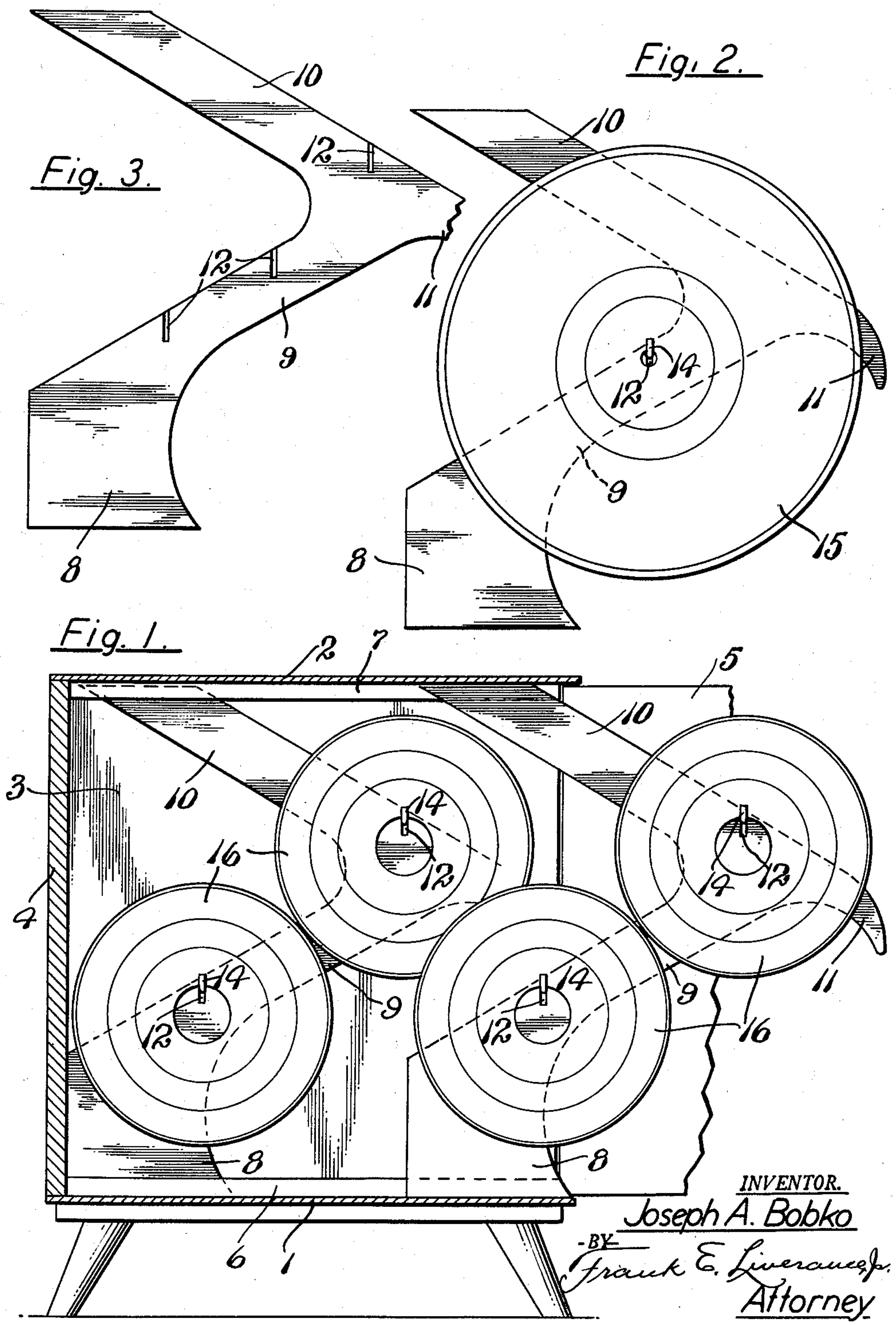
Fig. 2 is a side elevation of the record holder with large records carried thereon.
Fig. 3 is a similar side elevation, a part being broken away, showing the record holder with the immediate carrying members which carry the records removed.
Figures 4, 5, 6:
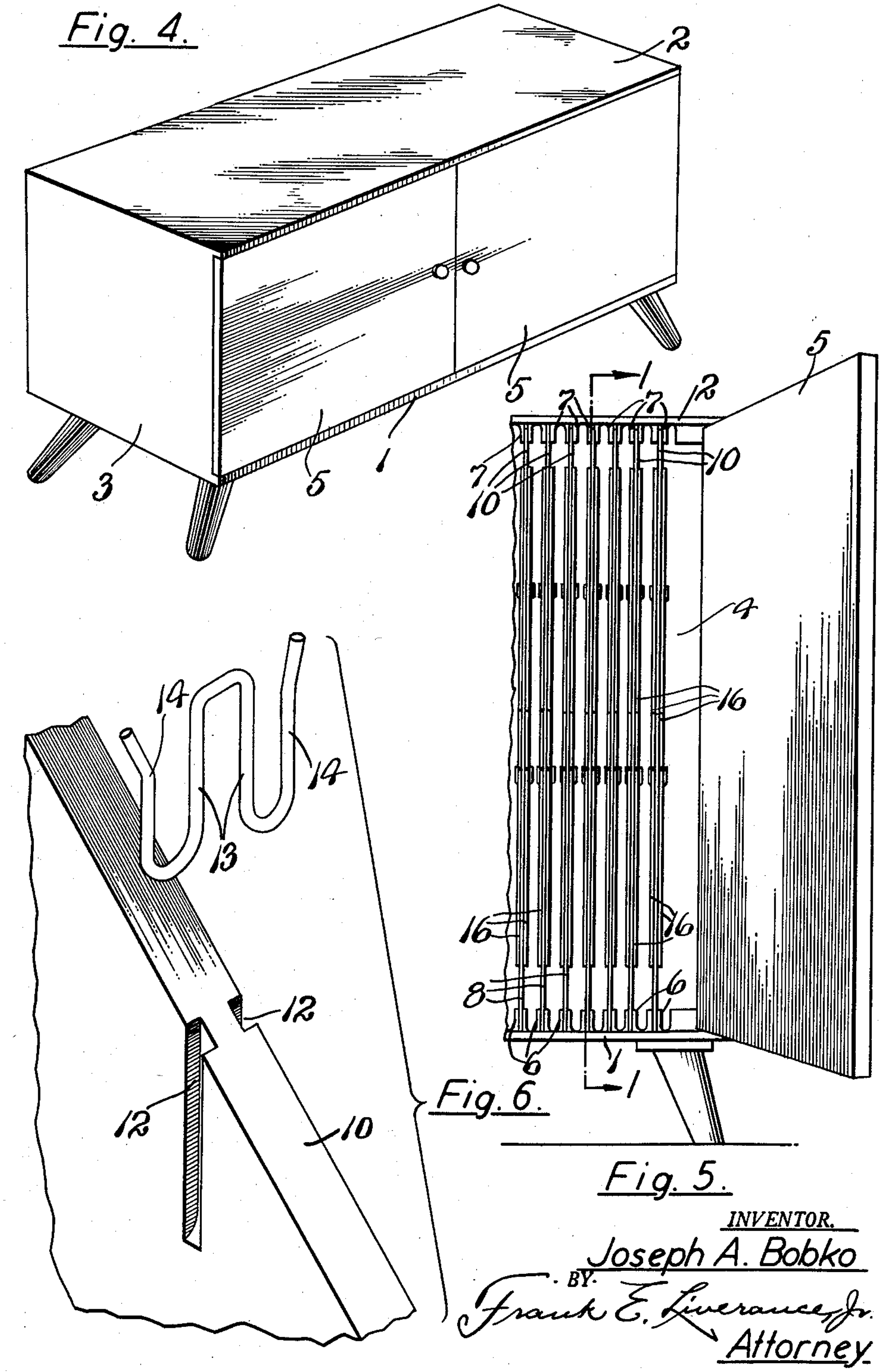
Fig. 4 is a perspective view of a cabinet in which the record holders of my invention may be mounted.
Fig. 5 is a fragmentary front elevation of the record holder shown in Fig. 1 with one of the doors open.
Fig. 6 is a perspective view of a record holder showing the immediate carrier for the record removed therefrom and above it.

The novel record holders of my invention may be mounted in a cabinet having a horizontal bottom 1, top 2, ends 3 and a back 4 and at the front hinged closure doors 5 which may be swung to open position.

At the upper side of the bottom 1 and lower side of the top 2 spaced parallel guides 6 and 7 are located, being vertically aligned in pairs, one pair of guides at the lower end receiving the lower portion of the record holder and a cooperating pair 7 at the upper end thereof.

The record holder of the form best shown in Fig. 2 is made of thin flat material which may be plastic or other suitable equivalent material. It has a lower rear foot 8 having a horizontal lower edge and a vertical back edge, from which an arm 9 extends upwardly and outwardly at an angle to the horizontal. Integrally joined with the arm 9 is an upper arm 10 which has a horizontal upper edge at its rear end and extends downwardly and forwardly to join with the arm 9 and is continued in a hook-like projection 11. Such record holders are slidably mounted between the pairs of guides 6 and 7, the foot members 8 riding against the bottom 1 between the lower guides 6 and the arms 10 at its upper rear ends being slidably received between pairs of the upper guides 7. Such record holders are moved back and forth between the guides by grasping the part 11 to exert downward pulling force or inward pushing force thereon.

The lower arm 9 from its upper edge downwardly for a distance is provided with two pairs of spaced slots or grooves 12, the slots of each pair being directly opposite each other in the arm 9. Similarly from the upper edge of the inner portion of the hook member 10, or at the juncture of the arms 9 and 10, is a like pair of slots. In the pairs of slots 12 an immediate record carrier 14 is seated being readily inserted therein and removed therefrom. Such carrier is made from a length of wire bent between its ends into inverted U-shape, having depending legs 13 terminating in return bent upwardly extending legs 14. The record carrier is insertable downwardly over the upper edge of the arm 9 or of the arm 10, being received in slots 12 and preferably pressing against the bottoms thereof, with the legs 14 spaced outwardly from the adjacent sides of the record holder.

Each record holder with one of the carriers connected with the uppermost of the slots 12 in the arm 9 is adapted to carry two gramophone disks 15, the legs 14 being inserted through the central openings thereof. Each record holder is also adapted to have two of the immediate carriers connected, one with the lowermost slots in the arm 9 and the other with the slots 12 at the upper edge of the carrier at the junction of the arms 9 and 10 so that the record holder can carry four records 16 of smaller diameter as shown in Fig. 1.

With the structure described a maximum in number of records may be carried in relatively small space as in the cabinet illustrated. It is of course apparent that for the cabinet, spaced horizontal shelves may be substituted having the pairs of guides 6 at the upper sides of the shelves and the pairs of guides 7 at the lower sides thereof.

The structure described is economically manufactured and is very effective for the purposes for which it has been produced.

The invention is defined in the appended claims and is to be considered comprehensive of all forms of structure coming within their scope.

I claim:

1. A disk carrier comprising: an upwardly and rearwardly inclined arm having a guide means at its upper end; a downwardly and rearwardly inclined arm connected to the first arm at the front ends of said arms; said last mentioned arm having a guide means at its lower end; said arms having a plurality of slots in the upper edge of at least one of said arms; and a carrier clip mounted in selected ones of said slots and having portions extending from each side of the arm for receiving a central opening in a disk and supporting the disk.

2. In means for storing disk-like articles having a central opening, upper and lower, spaced horizontal guides, one directly over the other; a V-shaped holder having two arms and a hook-shaped vertex; each of said arms having an end mounted in one of said guides; said arms having a plurality of slots in their upper edges; and a carrier clip mounted in selected ones of said slots and having portions extending from each side of the arm for receiving a central opening in a disk and supporting the disk; the position of said slots being such that the carrier clips can be supported by the arms in a variety of arrangements for supporting different shapes and numbers of disks.

References Cited in the file of this patent

UNITED STATES PATENTS

| | | |
|---|---|---|
| 338,440 | Raymond | Mar. 23, 1886 |
| 1,736,235 | Von Kersburg | Nov. 19, 1929 |
| 1,742,542 | Howell | Jan. 7, 1930 |
| 2,484,719 | McGuire | Oct. 11, 1949 |
| 2,773,727 | Bradley | Dec. 11, 1956 |

FOREIGN PATENTS

| | | |
|---|---|---|
| 346,928 | Great Britain | Apr. 23, 1931 |